United States Patent
Lee et al.

(10) Patent No.: US 9,962,681 B2
(45) Date of Patent: May 8, 2018

(54) ADSORBENT HAVING MICROWAVE ABSORPTION PROPERTY

(71) Applicant: ECOPRO CO., LTD., Chungcheongbuk-do (KR)

(72) Inventors: Dong Che Lee, Chungcheongbuk-do (KR); Seong Jin Yoon, Seoul (KR); Sung Jong Cho, Chungcheongbuk-do (KR); Jeong Yeon Kim, Chungcheongnam-do (KR); Sang Jun Park, Chungcheongbuk-do (KR); Tae Kyung Huh, Seoul (KR)

(73) Assignee: ECOPRO CO., LTD (KR)

( * ) Notice: Subject to any disclaimer, the term of this patent is extended or adjusted under 35 U.S.C. 154(b) by 0 days. days.

(21) Appl. No.: 15/540,815

(22) PCT Filed: Jan. 15, 2015

(86) PCT No.: PCT/KR2015/000445
§ 371 (c)(1),
(2) Date: Jun. 29, 2017

(87) PCT Pub. No.: WO2016/108323
PCT Pub. Date: Jul. 7, 2016

(65) Prior Publication Data
US 2018/0001302 A1    Jan. 4, 2018

(30) Foreign Application Priority Data
Dec. 31, 2014    (KR) ........................ 10-2014-0194646

(51) Int. Cl.
*B01J 20/34*    (2006.01)
*B01J 20/02*    (2006.01)
(Continued)

(52) U.S. Cl.
CPC ........... *B01J 20/3441* (2013.01); *B01J 20/02* (2013.01); *B01J 20/08* (2013.01); *B01J 20/18* (2013.01);
(Continued)

(58) Field of Classification Search
CPC .................................................. B01J 20/3441
See application file for complete search history.

(56) References Cited

U.S. PATENT DOCUMENTS

| | | | | |
|---|---|---|---|---|
| 3,130,007 | A * | 4/1964 | Breck | A23G 3/563 208/2 |
| 3,308,069 | A * | 3/1967 | Wadlinger et al. | B01J 29/7007 208/111.15 |
| 2010/0044275 | A1* | 2/2010 | Bauer | B01J 23/24 208/243 |

FOREIGN PATENT DOCUMENTS

| | | |
|---|---|---|
| KR | 1020030013240 A | 2/2003 |
| KR | 101208769 B1 | 11/2012 |
| KR | 101414039 B1 | 6/2014 |

OTHER PUBLICATIONS

Winé et al. "BETA zeolite supported on silicon carbide for Friedel-Crafts fixed-beds reactions" Journal of Molecular Catalysis A: Chemical, 278, (2007) 64-71.*
(Continued)

*Primary Examiner* — Peter F Godenschwager
(74) *Attorney, Agent, or Firm* — Mendelsohn Dunleavy, P.C.

(57) ABSTRACT

An adsorbent having a microwave absorption property is provided. The adsorbent having an improved microwave absorption property, which has a core-shell structure including a silicon carbide bead disposed therein, and an adsorbing material disposed outside the silicon carbide bead, can be provided. Also, the adsorbent may further include a plurality of silicon carbide particles dispersed and disposed therein
(Continued)

and having a diameter of 1 μm to 10 μm, and the adsorbing material may be ion-exchanged with a cation. Therefore, the adsorbent can be useful in improving desorption efficiency since the adsorbent may be rapidly heated by microwaves to reach the desorption temperature due to high reactivity to microwaves. Also, the adsorbent can be useful in maintaining full adsorption capacity without having an influence on adsorption quantity since the silicon carbide bead is disposed in the inner core of the adsorbent. Further, when the adsorbent is applied to conventional systems for removing organic compounds using microwaves or dehumidification systems, the adsorbent can be semi-permanently used, and may also have an effect of enhancing the energy efficiency by 30% or more, compared to adsorbents used in the conventional systems.

19 Claims, 3 Drawing Sheets

(51) Int. Cl.
*B01J 20/18* (2006.01)
*B01J 20/08* (2006.01)
*B01J 20/28* (2006.01)
*B01J 20/32* (2006.01)
*B01J 20/30* (2006.01)

(52) U.S. Cl.
CPC ..... *B01J 20/28016* (2013.01); *B01J 20/3078* (2013.01); *B01J 20/3204* (2013.01); *B01J 20/3238* (2013.01); *B01J 20/3293* (2013.01)

(56) References Cited

OTHER PUBLICATIONS

International Search Report and Written Opinion; dated Jul. 10, 2015 for PCT Application No. PCT/KR2015/000445.
Kassiba, A., et al. "Hybrid Core—Shell Nanocomposites Based on Silicon Carbide Nanoparticles Functionalized by conducting Polyaniline: Electron Paramagnetic Resonance Investigations." The Journal of Physical Chemistry C 111.31 (2007): 11544-11551.

* cited by examiner

ADSORBENT HAVING MICROWAVE ABSORPTION PROPERTY

TECHNICAL FIELD

The present invention relates to an adsorbent, and more particularly, to an adsorbent having an improved microwave absorption property.

BACKGROUND ART

As interest in the atmospheric environment increases with improvements of quality of life, rules regulating the emission of air pollutants such as volatile organic compounds (VOCs) generated in various industrial processes, coating facilities, sewage disposal plants, or incineration plants have been revised. Strong administrative measures such as suspension of business have been imposed on companies violating such rules. Therefore, much research has been conducted on removing such volatile organic compounds.

Representative conventional technology for removing volatile organic compounds includes an adsorption tower system using activated carbon, an evaporation system, a regenerative catalytic oxidation (RCO) system, and a regenerative thermal oxidation (RTO) system. However, the use of an adsorption tower causes an increase in maintenance cost due to a demand for its periodic exchange. Also, the evaporation system and the RCO and RTO systems have a problem of low energy efficiency.

To solve the above prior-art problems, technology for removing volatile organic compounds using microwaves has been developed. Specifically, the technology of removing volatile organic compounds using microwaves includes adsorbing volatile organic compounds onto an adsorbent and removing the volatile organic compounds by desorbing volatile organic compounds from the adsorbent. In this case, the adsorbent may be semi-permanently used since the adsorbent may be regenerated by means of the adsorption and desorption. To maximize the efficiency of such technology of removing volatile organic compounds using microwaves, adsorbents having high adsorptive strength to the organic compounds that are targets of removal and a high ability to absorb microwaves are required.

Meanwhile, the energy issue problems have emerged as a pressing matter all over the world as the demand for energy rapidly increases every year and the importance of technology requiring a large quantity of energy is being emphasized at the same time. Particularly, a rotor-type dehumidification system used in semiconductor and LCD processes is representative technology in which a large quantity of energy is consumed. To solve such energy-related problems, development of an energy-saving dehumidification system capable of enhancing energy efficiency using microwaves has been attempted. In the case of such a dehumidification system using microwaves, there is also a need for development of adsorbents which have both excellent adsorptive strength to moisture and an excellent ability to absorb microwaves with which the adsorbents are irradiated to be regenerated, thereby further improving the energy efficiency.

DISCLOSURE OF INVENTION

Technical Problem

The present invention is designed to solve the problems of the prior art, and therefore it is an object of the present invention to provide an adsorbent having an excellent property of absorbing microwaves with which the adsorbent is irradiated to desorb an adsorbed-material, as well as adsorptive strength to an adsorbing material.

Solution to Problem

According to an aspect of the present invention, there is provided an adsorbent having a microwave absorption property, characterized in that the adsorbent has a core-shell structure including a silicon carbide bead disposed therein, and an adsorbing material disposed outside the silicon carbide bead.

In this case, the adsorbing material may be selected from the group consisting of zeolite, activated alumina, and a mixture thereof.

The silicon carbide bead may have a diameter of 0.5 mm to 1.5 mm.

An increase in temperature of the adsorbent may be in a range of 30° C. to 50° C. when the adsorbent is irradiated with microwaves with a power of 1 kW for 60 seconds to 90 seconds.

The adsorbent may further include a plurality of silicon carbide particles dispersed and disposed in the adsorbing material and having a diameter of 1 μm to 10 μm.

The silicon carbide particles may be included at a content of 10% by weight to 15% by weight, based on 100% by weight of the adsorbent.

An increase in temperature of the adsorbent may be in a range of 40° C. to 60° C. when the adsorbent is irradiated with microwaves with a power of 1 kW for 60 seconds to 90 seconds.

The adsorbent may be ion-exchanged with a cation.

The cation may be at least one material selected from the group consisting of potassium (K), silver (Ag), sodium (Na), barium (Ba), lithium (Li), magnesium (Mg), strontium (Sr), phosphorus (P), manganese (Mn), calcium (Ca), and iron (Fe).

The adsorbent may be used to adsorb a volatile organic compound.

The adsorbing material included in the adsorbent may be selected from the group consisting of hydrophobic zeolite having a Si/Al ratio of 10 to 300, activated alumina, and a mixture thereof.

The adsorbent may be used to adsorb moisture.

The adsorbing material included in the adsorbent may be selected from the group consisting of hydrophilic zeolite having a Si/Al ratio of 1 to 10, activated alumina, and a mixture thereof.

Advantageous Effects of Invention

The adsorbent according to one exemplary embodiment of the present invention can be useful in improving desorption efficiency since the adsorbent may be rapidly heated by microwaves to reach the desorption temperature due to high reactivity to microwaves.

Also, the adsorbent according to one exemplary embodiment of the present invention can be useful in maintaining full adsorption capacity without having an influence on adsorption quantity since the silicon carbide bead is disposed in the inner core of the adsorbent.

Further, when the adsorbent according to one exemplary embodiment of the present invention is applied to conventional systems for removing organic compounds using microwaves or dehumidification systems, the adsorbent can be semi-permanently used, and may also have an effect of enhancing the energy efficiency by 30% or more, compared to adsorbents used in the conventional systems.

However, the technical objects of the present invention are not limited thereto, and other objects of the present invention which are not disclosed herein will become more apparent to those of ordinary skill in the art by describing in detail exemplary embodiments thereof.

BEST MODE FOR CARRYING OUT THE INVENTION

Hereinafter, preferred embodiments of the present invention will be described in detail with reference to the accompanying drawings.

While certain exemplary embodiments of the present invention are illustrated in the accompanying drawings and described below in further detail, it should be apparent that various changes and modifications can be made to the certain exemplary embodiments. However, it should be understood that the scope of the invention is not intended to be limited to the particular forms disclosed and the invention covers all modifications, equivalents, and alternatives falling within the spirit and scope of the invention as defined by the appended claims.

In the drawings, the thicknesses of layers and regions may be exaggerated or diminished for the sake of convenience of description. Throughout this specification, like or corresponding elements have the same or similar reference numerals.

The units 'mmol/g' and 'kg/kg' used to represent an adsorption quantity used in this specification may refer to an amount of material to be absorbed (for example, IPA, or $H_2O$) with respect to a unit weight of the adsorbent.

The present invention may provide an adsorbent having an improved microwave absorption property, characterized in that the adsorbent has a core-shell structure including a silicon carbide bead disposed in an inner core thereof, and an adsorbing material disposed outside the inner core.

The adsorbing material may be composed of a material having high adsorption performance with respect to a gaseous or particulate material, and the adsorbing material may be a porous material having a plurality of fine pores. Specifically, the adsorbing material may be selected from the group consisting of zeolite, activated alumina, and a mixture thereof.

Zeolite is known to be a three-dimensional (3D) inorganic polymer in which silicon (Si) and aluminum (Al) are linked via four cross-linking oxygen atoms. Here, since the aluminum binds to four oxygen atoms and is negatively charged, various types of cations are present in zeolite to compensate for these negative charges. More particularly, since the cations are present inside micropores, and the other spaces are generally filled with water molecules, the cations have relatively free mobility in the micropores, and may be easily ion-exchanged with other cations. Also, types of zeolite dehydrated by heating have a property of absorbing small molecules with different sizes which can pass through inlets of the micropores, such as water molecules, and filling inner empty spaces with the molecules. Therefore, dehydrated zeolite has been widely used as an adsorbent, or an absorbent. Generally, types of zeolite may be divided into β-zeolite, A-zeolite, ZSM-5-type zeolite, X-zeolite, Y-zeolite, and L-zeolite depending on the structure or the ratio of silicon and aluminum. In the present invention, types of zeolite capable of easily adsorbing a material to be adsorbed may be selected and used according to a purpose of use of the adsorbent. Specifically, according to one exemplary embodiment of the present invention, β-zeolite may be used as a material for adsorbing a volatile organic compound, and Y-zeolite may be used as a material for absorbing moisture.

Activated alumina is generally generated from a heat-treated alumina hydrate, and thus has high heat resistance and a wide specific surface area. Particularly, since activated alumina has a strong moisture absorption force, the activated alumina is an adsorbent widely used to remove moisture in compressed air.

Figure 1:
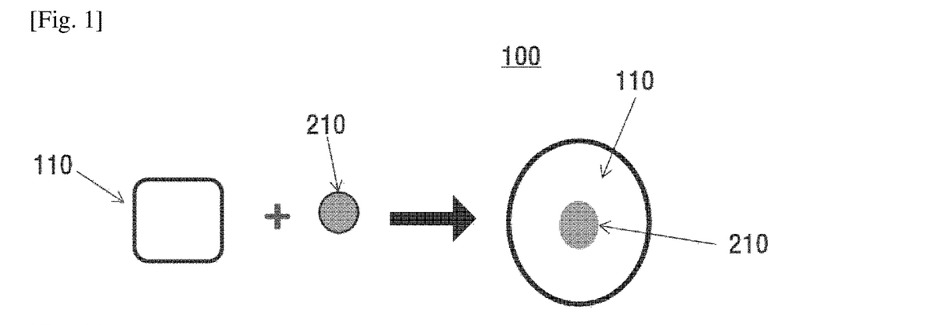
FIG. 1 is a schematic diagram showing an adsorbent having an improved microwave absorption property, which includes a silicon carbide bead according to one exemplary embodiment of the present invention.

FIG. 1 is a schematic diagram showing an adsorbent having an improved microwave absorption property, which includes a silicon carbide bead according to one exemplary embodiment of the present invention.

Referring to FIG. 1, according to the present invention, the adsorbing material 110 having such excellent adsorption capacity may be disposed outside the silicon carbide bead 210 which is disposed in the inner core of the adsorbent 100.

Specifically, the silicon carbide bead 210 may be composed of spherical, bead-shaped, or irregularly shaped silicon carbide. Silicon carbide has a property of absorbing microwaves, and this property of silicon carbide to absorb microwaves may be employed in the present invention so that the silicon carbide bead 210 is disposed in the inner core of the adsorbent 100, thereby improving microwave reactivity of the adsorbent 100.

The silicon carbide bead 210 may have a diameter of approximately 0.5 mm to 1.5 mm. Specifically, when the diameter of the silicon carbide bead 210 is less than 0.5 mm, a speed at which the silicon carbide bead 210 absorbs microwaves and is warmed to a desorption temperature may be reduced. On the other hand, when the diameter of the silicon carbide bead 210 is greater than 1.5 mm, an area of the adsorbing material 110 in the adsorbent 100 is very small, and thus adsorptive strength is reduced. As a result, the silicon carbide bead 210 having the diameter within this range may be used.

As described above, the adsorbent having the silicon carbide bead disposed in the inner core thereof and the adsorbing material disposed thereoutside may adsorb various materials to be adsorbed, such as moisture or a volatile organic compound. According to another exemplary embodiment, the adsorbent may be formed in any form in which it can be coated on a support. The support may be a metal foam, a ceramic foam, or a ceramic having a honeycomb structure, but the present invention is not particularly limited thereto.

Also, the adsorbent may be regenerated by desorbing a material adsorbed onto the adsorbent using various heating means, and thus may be semi-permanently used. Specifically, according to one exemplary embodiment of the present invention, the heating means for desorbing the adsorbent may be microwaves. Specifically, the adsorbent may be regenerated by heating the adsorbent with microwaves until the adsorbent is warmed to a desorption temperature in a predetermined range in which the material adsorbed onto the adsorbent may be desorbed from the adsorbent. For example, the microwaves radiated to the adsorbent may have a power of approximately 3 kW or 5 kW, and may be properly altered and applied according to types of the adsorbent, but the present invention is not particularly limited thereto.

In this case, the silicon carbide bead disposed in the inner core of the adsorbent may absorb the microwaves radiated to the adsorbent to desorb the adsorbed-material. Therefore, the microwaves radiated to the adsorbent may transfer microwave energy from the inner core of the adsorbent to the adsorbing material disposed outside the silicon carbide bead via a surface of the adsorbent and the silicon carbide bead having a property of absorbing the microwaves.

Figure 2:
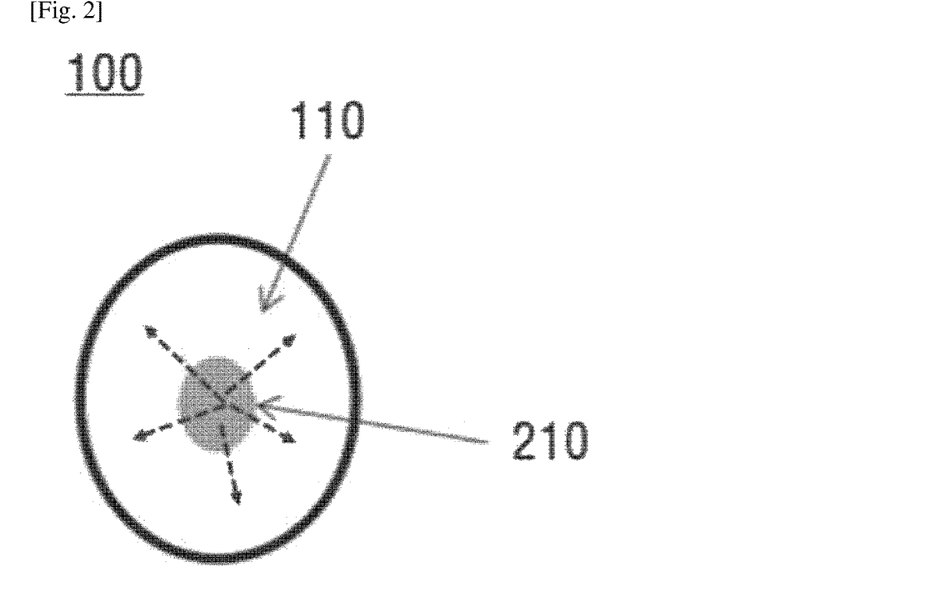
FIG. 2 is a schematic diagram showing the flow of microwave energy absorbed into the silicon carbide bead according to one exemplary embodiment of the present invention.

Specifically, the microwave energy absorbed into the silicon carbide bead 210 disposed in the inner core of the adsorbent 100 is transferred to the adsorbing material 110 disposed outside the silicon carbide bead 210, as shown in FIG. 2. In this case, an overall temperature of the adsorbent 100 may rapidly increase due to the transferred microwave energy, thereby improving desorption efficiency of the adsorbent.

This solves a problem in conventional adsorption systems using microwaves, in which the microwaves radiated to the adsorbent focus on a surface of the adsorbent due to the material absorbed onto the surface of the adsorbent, thus requiring large amounts of energy and time to warm the adsorbent to the desorption temperature.

According to one exemplary embodiment of the present invention, an increase in temperature of the adsorbent may be in a range of 30° C. to 50° C. when the adsorbent is irradiated with microwaves with a power of 1 kW for 60 seconds to 90 seconds. As described above, as energy of the microwaves radiated to the silicon carbide bead disposed in the inner core of the adsorbent is rapidly transferred to the adsorbing material disposed outside the inner core, the microwave energy may be easily transferred to the adsorbent as a whole. As a result, only the microwave energy within this range may be used to increase the temperature of the adsorbent to a temperature of 50° C. to 70° C. Hereinafter, the specific contents will be described in detail with reference to the following Examples and the accompanying drawings.

According to one exemplary embodiment, the adsorbent may further include a plurality of silicon carbide particles having a diameter of 1 μm to 10 μm. In this case, the silicon carbide particles are dispersed and disposed in the adsorbing material.

Figure 3:
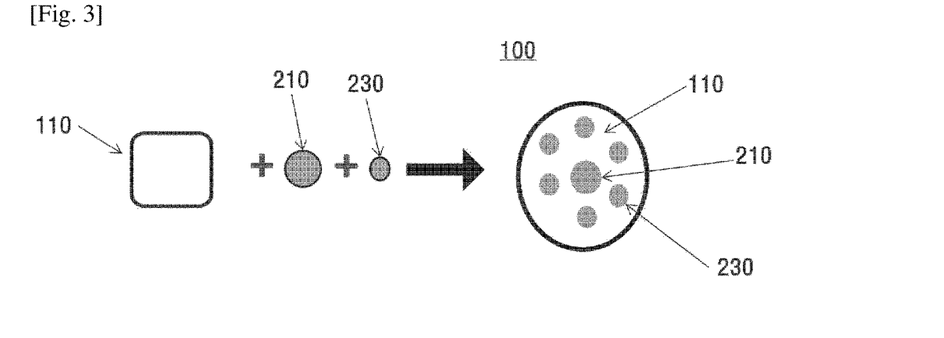
FIG. 3 is a schematic diagram showing an adsorbent having an improved microwave absorption property, which includes a silicon carbide bead and a plurality of silicon carbide particles according to one exemplary embodiment of the present invention.

FIG. 3 is a schematic diagram showing an adsorbent having an improved microwave absorption property, which includes a silicon carbide bead and a plurality of silicon carbide particles according to one exemplary embodiment of the present invention.

Referring to FIG. 3, the plurality of silicon carbide particles 230 refer to particles composed of silicon carbide (SiC) in the form of a fine powder. In this case, the plurality of silicon carbide particles 230 may be dispersed and disposed in the adsorbed-material. Like the silicon carbide bead 210, the silicon carbide particles 230 may absorb microwave energy radiated to desorb the adsorbent 100. Therefore, the silicon carbide particles 230 may easily transfer the microwave energy to the adsorbing material 110 together with the silicon carbide bead 210 disposed at the inner core.

Figure 4:
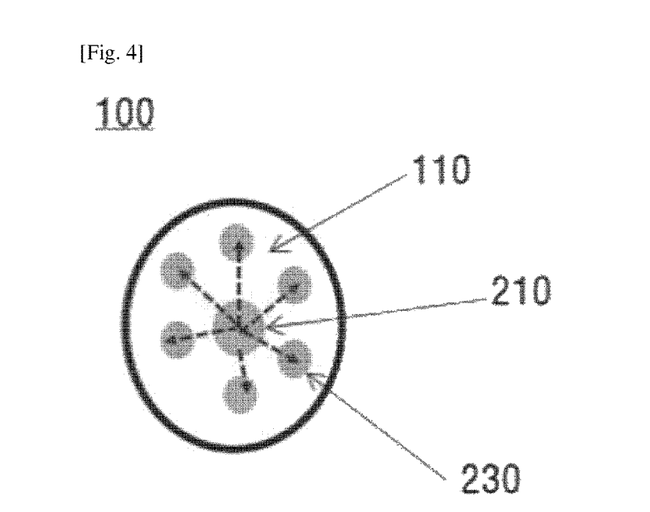
FIG. 4 is a schematic diagram showing the flow of microwave energy absorbed into the silicon carbide bead and the silicon carbide particles according to another exemplary embodiment of the present invention.

Specifically, as shown in FIG. 4, when the adsorbent 100 is irradiated with microwaves, first, some of the microwave energy is absorbed into the silicon carbide bead 210 disposed in the inner core of the adsorbent 100, and the absorbed microwave energy may be transferred to the adsorbing material 110 and the silicon carbide particles 230 disposed around the silicon carbide bead 210. Also, when the adsorbent 100 is irradiated with microwaves, some of the microwave energy is also absorbed into the silicon carbide particles 230 disposed outside the silicon carbide bead 210, and the absorbed microwave energy may be transferred to the adsorbing material 110 disposed around the silicon carbide particles 230. As described above, since the microwave energy radiated to the adsorbent 100 may be rapidly transferred to the entire region of the adsorbent 100 due to such structural characteristics, the adsorbent 100 may be rapidly warmed to a desorption temperature, thereby promoting an increase in desorption rate of the adsorbent 100.

More particularly, the plurality of silicon carbide particles 230 may have a diameter of 1 μm to 10 μm. When the diameter of the silicon carbide particles is less than 1 μm, the silicon carbide particles may be easily detached by the material adsorbed onto the adsorbent. On the other hand, when the diameter of the silicon carbide particles is greater than 10 μm, the adsorptive strength may be reduced when the area of the adsorbing material in the adsorbent is smaller. Therefore, the silicon carbide particles having the diameter within this range may be used.

According to one exemplary embodiment of the present invention, the silicon carbide particles may be included at a content of 10% by weight to 15% by weight, based on 100% by weight of the adsorbent. Specifically, when the silicon carbide particles are included at a content of less than 10% by weight, it is difficult for the silicon carbide particles to be uniformly dispersed and disposed in the adsorbent. On the other hand, when the silicon carbide particles are included at a content of greater than 15% by weight, the adsorption area may be reduced. Therefore, the silicon carbide particles may be included in the adsorbent within this content range.

According to one exemplary embodiment of the present invention, the silicon carbide bead is disposed in the inner core of the adsorbent, and the adsorbing material is disposed outside the silicon carbide bead 210. In this case, when the adsorbent in which the plurality of silicon carbide particles are dispersed and disposed is irradiated with microwaves with a power of 1 kW for 60 seconds to 90 seconds, an increase in temperature of the adsorbent may be in a range of 40° C. to 60° C. As described above, since the microwaves radiated to the adsorbent may be rapidly transferred from the inner core of the adsorbent to the adsorbing material disposed outside the inner core by means of the silicon carbide bead disposed in the inner core of the adsorbent, only the microwave energy within this range may be used to increase the temperature of the adsorbent to a temperature of 60° C. to 80° C. Hereinafter, the specific contents will be described in detail with reference to the following Examples and the accompanying drawings.

According to one exemplary embodiment, the adsorbing material may be ion-exchanged with a cation.

Specifically, the cation may be at least one material selected from the group consisting of potassium (K), silver (Ag), sodium (Na), barium (Ba), lithium (Li), magnesium (Mg), strontium (Sr), phosphorus (P), manganese (Mn), calcium (Ca), and iron (Fe). As described above, the adsorbing material ion-exchanged with the cation may have increased reactivity to microwaves, thereby improving a microwave absorption force. For example, when zeolite is used as the adsorbing material and ion-exchanged with potassium, the microwave adsorption ability of the adsorbent may be enhanced as the structure of zeolite is converted from sodium foam to potassium foam. Therefore, zeolite may react with the microwaves which are radiated to the adsorbing material or transferred by the silicon carbide bead and the silicon carbide particles to rapidly increase the temperature of the adsorbing material. Hereinafter, the specific contents will be described in detail with reference to the following Examples and the accompanying drawings.

According to one exemplary embodiment of the present invention, the adsorbent may be used to absorb a volatile organic compound. Specifically, the volatile organic compound may include acetylene, acetaldehyde, benzene, 1,3-butadiene, butane, 1-butene, 2-butene, cyclohexane, ethylene, formaldehyde, n-hexane, isopropyl alcohol, methanol, methyl ethyl ketone, propylene oxide, ethylbenzene, hydrochloric acid (HCl), toluene, xylene, styrene, or a mixture thereof, but the present invention is not particularly limited thereto.

When the adsorbent is used to absorb the volatile organic compound, the adsorbing material of the adsorbent may be composed of a material capable of easily absorbing the volatile organic compound. Specifically, the adsorbing material included in the adsorbent may be hydrophobic zeolite having a Si/Al ratio of 15 to 300, activated alumina, or a mixture thereof.

According to another exemplary embodiment of the present invention, the adsorbent may be used to absorb moisture. When the adsorbent is used to absorb moisture, the adsorbing material of the adsorbent may be composed of a material capable of easily absorbing moisture. Specifically, the adsorbing material included in the adsorbent may be hydrophilic zeolite having a Si/Al ratio of 1 to 10, activated alumina, or a mixture thereof.

As described above, in the adsorbent according to one exemplary embodiment of the present invention, the adsorbing material may be varied according to types of a material to be absorbed (i.e., a volatile organic compound, or moisture) to provide excellent adsorptive strength to the material to be absorbed. Also, since the reactivity to the microwaves may be enhanced by the silicon carbide bead and/or the silicon carbide particles, and/or the ion exchange with the cation as described above, the adsorbent may be actively applied to systems for removing a volatile organic compound using microwaves, or dehumidification systems.

MODE FOR THE INVENTION

Hereinafter, preferred embodiments are provided to aid in understanding the present invention. However, it should be understood that detailed description provided herein is merely intended to provide a better understanding of the present invention, and is not intended to limit the scope of the present invention.

EXAMPLES

Example 1: Preparation of VOC Adsorbent Including Silicon Carbide Bead

A silicon carbide bead having a diameter of 1 mm was prepared, and an adsorbent was molded so that the adsorbent had a core-shell structure by coating the outside of the silicon carbide bead with β-zeolite having a Si/Al ratio of 112 as an adsorbing material using an inorganic adsorption binder such as 10% to 15% aluminum sol. The molded adsorbent was dried at 110° C., and calcined at 550° C. to burn the binder, thereby preparing a bead-shaped VOC adsorbent having a diameter of 3 mm in which zeolite and silicon carbide were mixed at a weight ratio of 9:1.

Comparative Example 1: Preparation of VOC Adsorbent Having No Silicon Carbide Bead A bead-shaped VOC adsorbent having a diameter of 3 mm, which was composed of β-zeolite having a Si/Al ratio of 112 as an adsorbing material, was prepared.

Example 2: Preparation of Moisture Adsorbent Including Silicon Carbide Bead

A silicon carbide bead having a diameter of 1 mm was prepared, and an adsorbent was molded so that the adsorbent had a core-shell structure by coating the outside of the silicon carbide bead with Y-zeolite having a Si/Al ratio of 5 as an adsorbing material using an inorganic adsorption binder such as 10% to 15% aluminum sol. The molded adsorbent was dried at 110° C., and calcined at 550° C. to burn the binder, thereby preparing a bead-shaped moisture adsorbent having a diameter of 3 mm in which zeolite and silicon carbide were mixed at a weight ratio of 9:1.

Comparative Example 2: Preparation of Moisture Adsorbent Having No Silicon Carbide Bead A bead-shaped VOC adsorbent having a diameter of 3 mm, which was composed of Y-zeolite having a Si/Al ratio of 5, was prepared.

Figure 5:
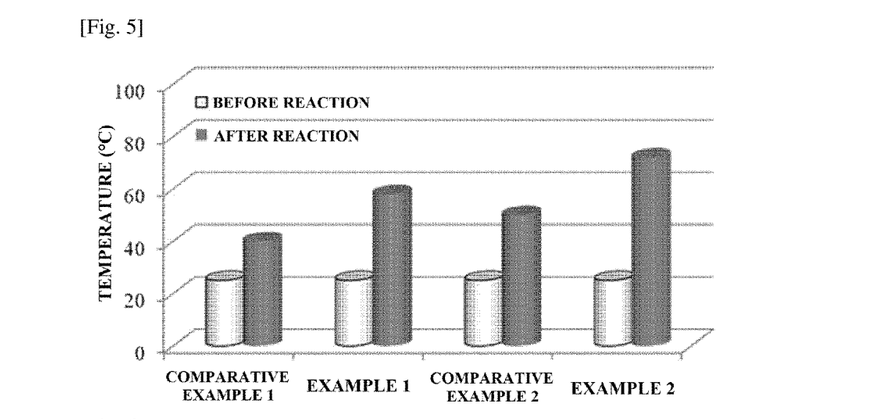
FIG. 5 is a graph showing the results obtained by comparing the microwave absorption properties of adsorbents prepared in Examples 1 and 2 and Comparative Examples 1 and 2 of the present invention.

FIG. 5 is a graph of the results obtained by comparing the microwave absorption properties of adsorbents prepared in Examples 1 and 2 and Comparative Examples 1 and 2 of the present invention. More particularly, 100 g of each of the adsorbents was added into a beaker, the adsorbents were irradiated with microwaves with a power of 1 kW for one minute, and the temperatures of the adsorbents after the reaction were compared and are shown in the graph. Specifically, the results are as listed in the following Table 1.

TABLE 1

| Items | Comparative Example 1 | Example 1 | Comparative Example 2 | Example 2 |
| --- | --- | --- | --- | --- |
| Temperature (° C.) before reaction | 25 | 25 | 25 | 25 |
| Temperature (° C.) after reaction | 40 | 58 | 50 | 72 |
| Change in temperature (° C.) | 15 | 33 | 25 | 47 |
| IPA or H$_2$O adsorption quantity | 0.8 mmol/g | 0.78 mmol/g | 0.12 kg/kg | 0.11 kg/kg |

Comparing the microwave absorption properties of the VOC adsorbent prepared in Comparative Example 1 and the VOC adsorbent including the silicon carbide bead prepared in Example 1 with reference to FIG. 5 and Table 1, it can be seen that the temperature of the VOC adsorbent prepared in Comparative Example 1 was 40° C. after irradiation with microwaves, indicating that the temperature of the VOC adsorbent increased by approximately 15° C., compared to the temperature before irradiation with microwaves. On the other hand, it can be seen that the temperature of the adsorbent prepared in Example 1 in which the silicon carbide bead was disposed in the inner core thereof was 58° C. after irradiation with microwaves, indicating that the temperature of the adsorbent increased by approximately 33° C., compared to the temperature before irradiation with microwaves. Also, the same quantity of isopropyl alcohol (IPA) was adsorbed onto the adsorbents to compare VOC adsorption quantities. As a result, it can be seen that the IPA adsorption quantity of the VOC adsorbent of Comparative Example 1 was 0.8 mmol/g, and the IPA adsorption quantity of the VOC adsorbent of Example 1 was 0.78 mmol/g.

Also, the microwave absorption properties of the moisture adsorbent prepared in Comparative Example 2 and the moisture adsorbent including the silicon carbide bead prepared in Example 2 were compared. As a result, it can be seen that the temperature of the adsorbent prepared in Comparative Example 2 was 50° C. after irradiation with microwaves, indicating that the temperature of the adsorbent increased by approximately 25° C. On the other hand, it can be seen that the temperature of the adsorbent prepared in Example 2 in which the silicon carbide bead was disposed in the inner core thereof was 72° C. after irradiation with microwaves, indicating that the temperature of the adsorbent increased by approximately 47° C. Also, the same quantity of moisture was adsorbed onto the adsorbents. As a result, it can be seen that the moisture adsorption quantity of the adsorbent of Comparative Example 2 was 0.12 mmol/g, and the moisture adsorption quantity of the adsorbent of Example 2 was 0.11 mmol/g.

As described above, it was revealed that the VOC adsorbent prepared in Example 1 of the present invention and the moisture adsorbent prepared in Example 2 had a silicon carbide structure having a microwave adsorption ability, that is, a structure in which the silicon carbide bead was disposed in the inner core thereof, thereby enabling the inner core of the adsorbent to absorb microwave energy. Also, the microwave energy was able to be easily transferred from the inner core to the outside of the inner core so that the adsorbent had an improved microwave absorption property. Therefore, the VOC adsorbent had high reactivity to microwaves radiated to the adsorbent upon desorption, and thus the temperature of the adsorbent was able to increase to a higher extent than the adsorbents prepared in Comparative Examples 1 and 2. As a result, the desorption temperature was able to rapidly increase using a small quantity of microwave energy. Also, the VOC adsorbent prepared in Example 1 of the present invention and the moisture adsorbent prepared in Example 2 had a structure in which the silicon carbide bead having a microwave adsorption ability was disposed in the inner core thereof, but the moisture adsorbent of Example 2 had an adsorption or dehumidification quantity similar to the conventional adsorbents. As described above, it was confirmed that the VOC adsorbent prepared in Example 1 of the present invention and the moisture adsorbent prepared in Example 2 were able to have improved desorption efficiency while maintaining the adsorption capacity of the adsorbent, thereby improving energy efficiency for regenerating the adsorbent.

Example 3: Preparation of VOC Adsorbent Including Silicon Carbide Bead and Dispersed Silicon Carbide Particles A silicon carbide bead having a diameter of 1 mm was prepared, and silicon carbide particles having a diameter of 10 μm were physically mixed with β-zeolite having a Si/Al ratio of 112 as an adsorbing material. Thereafter, an adsorbent was molded so that the adsorbent had a core-shell structure by coating the outside of the silicon carbide bead mixture, in which the zeolite and silicon carbide particles were mixed, using an inorganic adsorption binder such as 10% to 15% aluminum sol. The molded adsorbent was dried at 110° C., and calcined at 550° C. to burn the binder, thereby preparing a bead-shaped VOC adsorbent having a diameter of 3 mm.

Example 4: Preparation of Moisture Adsorbent Including Silicon Carbide Bead and Dispersed Silicon Carbide Particles A silicon carbide bead having a diameter of 1 mm was prepared, and silicon carbide particles having a diameter of 10 μm were physically mixed with Y-zeolite having a Si/Al ratio of 5 as an adsorbing material. Thereafter, an adsorbent was molded so that the adsorbent had a core-shell structure by coating the outside of the silicon carbide bead with the mixture of the zeolite and silicon carbide particles using an inorganic adsorption binder such as 10% to 15% aluminum sol. The molded adsorbent was dried at 110° C., and calcined at 550° C. to burn the binder, thereby preparing a bead-shaped moisture adsorbent having a diameter of 3 mm.

Figure 6:
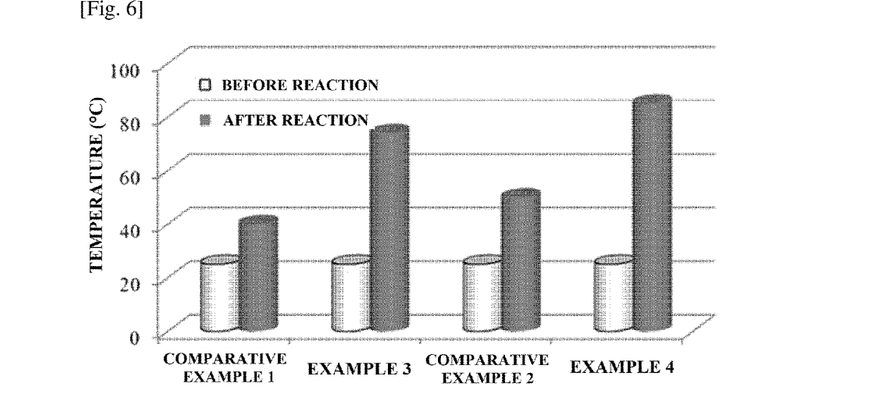
FIG. 6 is a graph showing the results obtained by comparing the microwave absorption properties of adsorbents prepared in Examples 3 and 4 and Comparative Examples 3 and 4 of the present invention.

FIG. 6 is a graph showing the results obtained by comparing the microwave absorption properties of adsorbents prepared in Examples 3 and 4 and Comparative Examples 1 and 2 of the present invention. More particularly, 100 g of each of the adsorbents was added into a beaker, the adsorbents were irradiated with microwaves with a power of 1 kW for one minute, and the temperatures of the adsorbents after the reaction were compared and are shown in the graph. Specifically, the results are as listed in the following Table 2.

TABLE 2

| Items | Comparative Example 1 | Example 3 | Comparative Example 2 | Example 4 |
| --- | --- | --- | --- | --- |
| Temperature (° C.) before reaction | 25 | 25 | 25 | 25 |
| Temperature (° C.) after reaction | 40 | 74 | 50 | 85 |
| Change in temperature (° C.) | 15 | 49 | 25 | 60 |
| IPA or $H_2O$ adsorption quantity | 0.8 mmol/g | 0.61 mmol/g | 0.12 kg/kg | 0.089 kg/kg |

Comparing the microwave absorption properties of the VOC adsorbent prepared in Comparative Example 1 and the VOC adsorbent including the silicon carbide bead and the silicon carbide particles prepared in Example 3 with reference to FIG. 6 and Table 2, it can be seen that the temperature of the VOC adsorbent prepared in Comparative Example 1 was 40° C. after irradiation with microwaves, indicating that the temperature of the VOC adsorbent increased by approximately 15° C., compared to the temperature before irradiation with microwaves. On the other hand, it can be seen that the temperature of the adsorbent prepared in Example 3 in which the silicon carbide bead was disposed in the inner core thereof and the silicon carbide particles were dispersed in the adsorbing material was 74° C. after irradiation with microwaves, indicating that the temperature of the adsorbent increased by approximately 49° C., compared to the temperature before irradiation with microwaves. Also, the same quantity of isopropyl alcohol (IPA) was adsorbed onto the adsorbents to compare VOC adsorption quantities. As a result, it can be seen that the IPA adsorption quantity of the VOC adsorbent of Comparative Example 1 was 0.8 mmol/g, and the IPA adsorption quantity of the VOC adsorbent of Example 3 was 0.61 mmol/g.

Also, the microwave absorption properties of the moisture adsorbent prepared in Comparative Example 2 and the moisture adsorbent including the silicon carbide bead and the silicon carbide particles prepared in Example 4 were compared. As a result, it can be seen that the temperature of the adsorbent prepared in Comparative Example 2 was 50° C. after irradiation with microwaves, indicating that the temperature of the adsorbent increased by approximately 25° C. On the other hand, it can be seen that the temperature of the adsorbent prepared in Example 4 in which the silicon carbide bead was disposed in the inner core thereof and the silicon carbide particles were dispersed in the adsorbing material was 85° C. after irradiation with microwaves, indicating that the temperature of the adsorbent increased by approximately 60° C. Also, the same quantity of moisture was adsorbed onto the adsorbents. As a result, it can be seen that the moisture adsorption quantity of the adsorbent of Comparative Example 2 was 0.12 kg/kg, and the moisture adsorption quantity of the adsorbent of Example 4 was 0.089 kg/kg.

As described above, it was revealed that the VOC adsorbent prepared in Example 3 of the present invention and the moisture adsorbent prepared in Example 4 had a silicon carbide structure composed of silicon carbide having a microwave adsorption ability, that is, a structure in which powdery silicon carbide particles were disposed in the inner core thereof together with the silicon carbide bead, thereby transferring the microwave energy absorbed into the silicon carbide bead disposed in the inner core of the adsorbent to the adsorbing material disposed outside the silicon carbide bead. Also, the microwave energy was able to be easily transferred from the inner core to the absorbing material so that the adsorbent had an improved microwave absorption property. The silicon carbide particles themselves were able to easily absorb microwaves so that the adsorbent had an improved microwave absorption property as a whole. Therefore, as described above, it was revealed that the VOC adsorbent had high reactivity to microwaves radiated to the adsorbent upon desorption, and thus the temperature of the adsorbent was able to increase to a higher extent than the adsorbents prepared in Comparative Examples 1 and 2. As a result, the desorption temperature was able to rapidly increase using a small quantity of microwave energy. Also, the VOC adsorbent prepared in Example 3 of the present invention, and the moisture adsorbent prepared in Example 4 had a decreased adsorption or dehumidification quantity of approximately 0.19 mmol/g and 0.31 kg/kg, compared to those of the adsorbents prepared in Comparative Examples 1 and 2, but that the temperatures of the adsorbents of Examples 3 and 4 were much higher than those of the adsorbents of Comparative Examples 1 and 2 upon irradiation with microwaves. Therefore, it can be seen that energy was able to be further saved in the case of the adsorbents of Examples 3 and 4, compared to the adsorbents of Comparative Examples 1 and 2, indicating that the adsorbents of Examples 3 and 4 had much better energy efficiency than the adsorbents of Comparative Examples 1 and 2.

Example 5: VOC Adsorbent Ion-Exchanged with Potassium

As an adsorbing material, 200 g of β-zeolite having a Si/Al ratio of 112 was added to 500 cc of distilled water, and a 0.2 M $KNO_3$ solution was injected, and stirred at room temperature for 24 hours. The stirred adsorbent was filtered five times using distilled water, dried at 110° C. for 10 hours, and then calcined at 550° C. to prepare a bead-shaped VOC adsorbent having a diameter of 3 mm, which was ion-exchanged with potassium.

Figure 7:
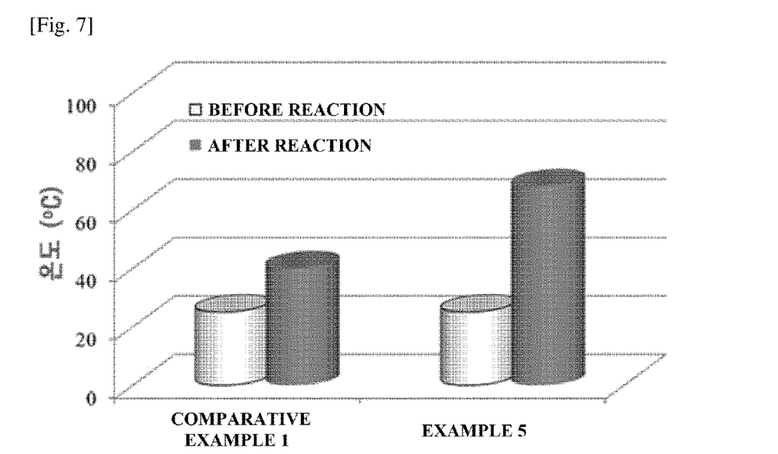
FIG. 7 is a graph showing the results obtained by comparing the microwave absorption properties of VOC adsorbents prepared in Example 5 and Comparative Example 5 of the present invention.

FIG. 7 is a graph showing the results obtained by comparing the microwave absorption properties of VOC adsorbents prepared in Example 5 and Comparative Example 1 of the present invention. More particularly, 100 g of each of the adsorbents was added into a beaker, the adsorbents were irradiated with microwaves with a power of 1 kW for one minute, and the temperatures of the adsorbents after the reaction were compared and are shown in the graph. Specifically, the results are as listed in the following Table 3.

TABLE 3

| Items | Comparative Example 1 | Example 5 |
| --- | --- | --- |
| Temperature (° C.) before reaction | 25 | 25 |
| Temperature (° C.) after reaction | 40 | 68 |
| Change in temperature (° C.) | 15 | 43 |
| IPA adsorption quantity (mmol/g) | 0.8 | 0.81 |

Referring to FIG. 7, it can be seen that the temperature of the VOC adsorbent prepared in Comparative Example 1 was 40° C. after irradiation with microwaves, indicating that the temperature of the VOC adsorbent increased by approximately 15° C., compared to the temperature before irradiation with microwaves. On the other hand, it can be seen that the temperature of the VOC adsorbent prepared in Example 5, which was ion-exchanged with potassium, was approximately 68° C. after irradiation with microwaves, indicating that the temperature of the VOC adsorbent increased by approximately 43° C., compared to the temperature before irradiation with microwaves. Also, the same quantity of isopropyl alcohol (IPA) was adsorbed onto the adsorbents to compare VOC adsorption quantities. As a result, it can be seen that the IPA adsorption quantity of the VOC adsorbent of Comparative Example 1 was 0.8 mmol/g, and the IPA adsorption quantity of the VOC adsorbent of Example 5 was 0.81 mmol/g.

As described above, it can be seen that the adsorbent prepared in Example 5 of the present invention had an improved microwave absorption property as the adsorbent was ion-exchanged with a cation such as potassium. Also, it can be seen that the adsorption quantity of the adsorbent prepared in Example 5 of the present invention increased by 0.01 mmol/g, compared to that of the adsorbent prepared in Comparative Example 1. Based on these facts, it was revealed that the desorption efficiency of the adsorbent was able to be improved together with the silicon carbide structures (a silicon carbide bead, and silicon carbide particles) disclosed in the present invention as the adsorbent according to one exemplary embodiment of the present invention was ion-exchanged with the cation so that the adsorbent had an improved microwave absorption property.

Comparative Example 3: Preparation of VOC Adsorbent Including Silicon Carbide Particles Silicon carbide particles having a diameter of 10 μm were physically mixed with β-zeolite having a Si/Al ratio of 112 as an adsorbing material to prepare a bead-shaped VOC adsorbent having a diameter of 3 mm, in which zeolite and silicon carbide were mixed at a weight ratio of 9:1.

Comparative Example 4: Preparation of Moisture Adsorbent Including Silicon Carbide Particles Silicon carbide particles having a diameter of 10 μm were physically mixed with Y-zeolite having a Si/Al ratio of 5 as an adsorbing material to prepare a bead-shaped VOC adsorbent having a diameter of 3 mm, in which zeolite and silicon carbide were mixed at a weight ratio of 9:1.

Figure 8A:
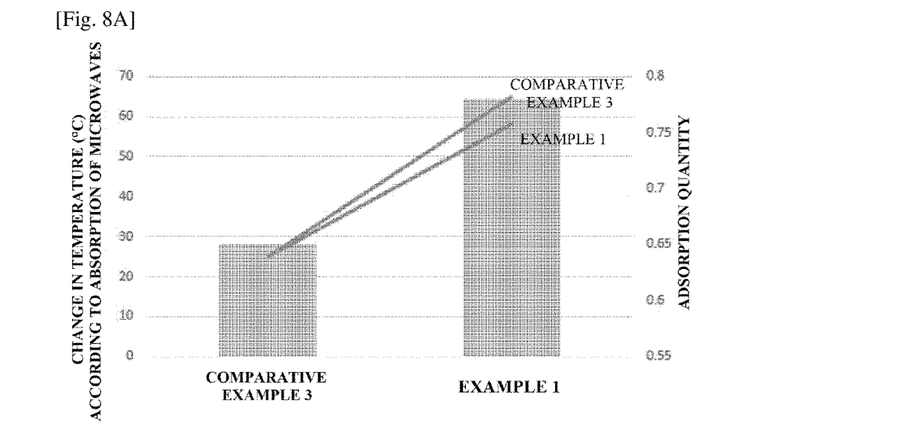
FIGS. 8A and 8B are graphs showing the results obtained by comparing the microwave absorption properties and adsorption quantities of the adsorbents prepared in Examples 1 and 2 and Comparative Examples 3 and 4 of the present invention.
Figure 8B:
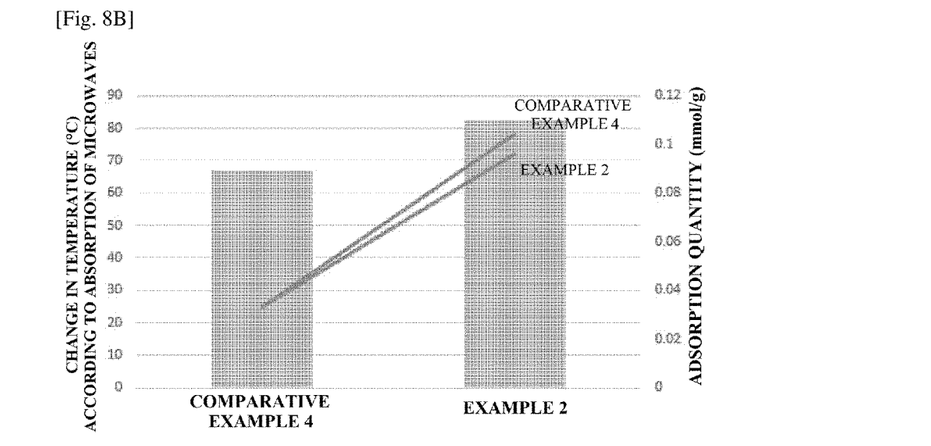

FIGS. 8A and 8B are graphs showing the results obtained by comparing the microwave absorption properties and adsorption quantities of the adsorbents prepared in Examples 1 and 2 and Comparative Examples 3 and 4 of the present invention. In this case, 100 g of each of the adsorbents was added into a beaker, the adsorbents were irradiated with microwaves with a power of 1 kW for one minute, and the temperatures of the adsorbents after the reaction were compared and are shown in the graph. Specifically, the results are as listed in the following Table 4. In FIGS. 8A and 8B, the lines represent changes in temperatures of the adsorbents according to irradiation with microwaves, and the bar graphs represents adsorption quantities of the adsorbents.

TABLE 4

| Items | Comparative Example 3 | Example 1 | Comparative Example 4 | Example 2 |
| --- | --- | --- | --- | --- |
| Temperature (° C.) before reaction | 25 | 25 | 25 | 25 |
| Temperature (° C.) after reaction | 65 | 58 | 78 | 72 |
| Change in temperature (° C.) | 40 | 33 | 53 | 47 |
| IPA or H$_2$O adsorption quantity | 0.65 mmol/g | 0.78 mmol/g | 0.089 kg/kg | 0.11 kg/kg |

Comparing the microwave absorption properties of the VOC adsorbent including the silicon carbide particles prepared in Comparative Example 3 and the VOC adsorbent including the silicon carbide bead prepared in Example 1 with reference to FIGS. 8A and 8B and Table 4, it can be seen that the temperature of the VOC adsorbent prepared in Comparative Example 3 was 65° C. after irradiation with microwaves, indicating that the temperature of the VOC adsorbent increased by approximately 40° C., compared to the temperature before irradiation with microwaves. On the other hand, it can be seen that the temperature of the adsorbent prepared in Example 1 in which the silicon carbide bead was disposed in the inner core thereof was 58° C. after irradiation with microwaves, indicating that the temperature of the adsorbent increased by approximately 33° C., compared to the temperature before irradiation with microwaves. Also, the same quantity of isopropyl alcohol (IPA) was adsorbed onto the adsorbents to compare VOC adsorption quantities. As a result, it can be seen that the IPA adsorption quantity of the VOC adsorbent of Comparative Example 1 was 0.65 mmol/g, and the IPA adsorption quantity of the VOC adsorbent of Example 1 was 0.78 mmol/g.

Also, the microwave absorption properties of the moisture adsorbent including the silicon carbide particles prepared in Comparative Example 4 and the moisture adsorbent including the silicon carbide bead prepared in Example 2 were compared. As a result, it can be seen that the temperature of the adsorbent prepared in Comparative Example 4 was 78° C. after irradiation with microwaves, indicating that the temperature of the adsorbent increased by approximately 53° C. On the other hand, it can be seen that the temperature of the adsorbent prepared in Example 2 in which the silicon carbide bead was disposed in the inner core thereof was 72° C. after irradiation with microwaves, indicating that the temperature of the adsorbent increased by approximately 47° C. Also, the same quantity of moisture was adsorbed onto the adsorbents. As a result, it can be seen that the moisture adsorption quantity of the adsorbent of Comparative Example 4 was 0.089 kg/kg, and the moisture adsorption quantity of the adsorbent of Example 2 was 0.011 kg/kg.

As described above, it was revealed that the temperature of the adsorbent increased to a much higher extent upon irradiation with microwaves since the conventional adsorbents prepared in Comparative Examples 3 and 4 in which the silicon carbide particles were physically mixed with the adsorbing material had improved microwave reactivity due to the presence of the silicon carbide particles, but the adsorption area to which the adsorbing material was able to be absorbed was significantly reduced due to the random distribution of the silicon carbide particles in the adsorbent. Therefore, it was confirmed that the adsorption quantities of the adsorbents of Comparative Examples 3 and 4 were much lower than those of the adsorbents of Examples 1 and 2 of the present invention. On the other hand, it was revealed that the VOC adsorbent prepared in Example 1 the present invention and the moisture adsorbent prepared in Example 2 were able to have excellent energy efficiency for regenerating the adsorbent since the silicon carbide bead having a microwave adsorption ability was disposed in the inner core of the adsorbent so that the microwave absorption properties of the adsorbents could be improved and the full adsorption and dehumidification quantities of the adsorbents could be maintained, as shown in FIG. 5.

INDUSTRIAL APPLICABILITY

The present invention has been described in detail. However, it should be understood that the detailed description and specific examples, while indicating preferred embodiments of the invention, are given by way of illustration only, and various changes and modifications within the spirit and scope of the invention will become apparent to those skilled in the art from this detailed description.

The invention claimed is:

1. An adsorbent having a microwave absorption property, which adsorbent has a core-shell structure comprising:
  a silicon carbide bead disposed therein;
  an adsorbing material disposed outside the silicon carbide bead; and
  a plurality of silicon carbide particles having a diameter of 1 μm to 10 μm are dispersed and disposed in the adsorbing material.

2. The adsorbent of claim 1, wherein the adsorbing material is selected from the group consisting of zeolite, activated alumina, and a mixture thereof.

3. The adsorbent of claim 1, wherein the silicon carbide bead has a diameter of approximately 0.5 mm 1.5 mm.

4. The adsorbent of claim 1, wherein an increase in temperature of the adsorbent is in a range of 30° C. to 50° C. when the adsorbent is irradiated with 1 kW microwaves for 60 seconds to 90 seconds.

5. The adsorbent of claim 4, wherein the adsorbent is able to adsorb a volatile organic compound.

6. The adsorbent of claim 4, wherein the adsorbent is able to adsorb moisture.

7. The adsorbent of claim 1, wherein the silicon carbide particles are included at a content of 10% by weight to 15% by weight, based on 100% by weight of the adsorbent.

8. The adsorbent of claim 7, wherein the adsorbent is able to adsorb a volatile organic compound.

9. The adsorbent of claim 7, wherein the adsorbent is able to adsorb moisture.

10. The adsorbent of claim 1, wherein an increase in temperature of the adsorbent is in a range of 40° C. to 60° C. when the adsorbent is irradiated with microwaves with a power of 1 kW for 60 seconds to 90 seconds.

11. The adsorbent of claim 1, wherein the adsorbing material is obtained by ion-exchange with a cation.

12. The adsorbent of claim 11, wherein the cation is at least one material selected from the group consisting of potassium (K), silver (Ag), sodium (Na), barium (Ba), lithium (Li), magnesium (Mg), strontium (Sr), phosphorus (P), manganese (Mn), calcium (Ca), and iron (Fe).

13. The adsorbent of claim 11, wherein the adsorbent is able to adsorb a volatile organic compound.

14. The adsorbent of claim 1, wherein the adsorbent is able to adsorb a volatile organic compound.

15. The adsorbent of claim 14, wherein adsorbing material included in the adsorbent is selected from the group consisting of hydrophobic zeolite having a Si/Al ratio of 10 to 300, activated alumina, and a mixture thereof.

16. The adsorbent of claim 1, wherein the adsorbent is able to adsorb moisture.

17. The adsorbent of claim 16, wherein adsorbing material included in the adsorbent is selected from the group consisting of hydrophilic zeolite having a Si/Al ratio of 1 to 10, activated alumina, and a mixture thereof.

18. The adsorbent of claim 1, wherein the adsorbent is able to adsorb a volatile organic compound.

19. The adsorbent of claim 1, wherein the adsorbent is able to adsorb moisture.

* * * * *